United States Patent [19]
Brown et al.

[11] 3,853,624
[45] Dec. 10, 1974

[54] HIGH ENERGY DENSITY IRON-NICKEL BATTERY

[75] Inventors: Jack T. Brown, Pittsburgh; William Feduska, Sewickley; Carl C. Hardman; William Pollack, both of Pittsburgh, all of Pa.

[73] Assignee: Westinghouse Electric Corporation, Pittsburgh, Pa.

[22] Filed: Apr. 20, 1972

[21] Appl. No.: 246,088

Related U.S. Application Data

[63] Continuation of Ser. No. 55,824, July 17, 1970.

[52] U.S. Cl. ................................. 136/25, 136/28
[51] Int. Cl. ..................................... H01m 43/04
[58] Field of Search ............ 136/25, 28, 35, 36, 49, 136/65

[56] References Cited
UNITED STATES PATENTS

| | | | |
|---|---|---|---|
| 3,262,815 | 7/1966 | Langer et al. | 136/28 |
| 3,266,936 | 8/1966 | Krebs | 136/36 |
| 3,507,696 | 4/1970 | Jackovitz et al. | 136/25 |
| 3,527,613 | 9/1970 | Hardman | 136/25 |

FOREIGN PATENTS OR APPLICATIONS
457,194   6/1949   Canada ................................. 52/664

*Primary Examiner*—Winston A. Douglas
*Assistant Examiner*—C. F. Lefevour
*Attorney, Agent, or Firm*—D. P. Cillo

[57] ABSTRACT

An iron-nickel storage battery, consisting of at least one negative electrode plate and at least one positive electrode plate housed in a case containing an alkaline electrolyte is made by (1) depositing iron active material and nickel active material within the pore volume of flexible, expansible, 75 to 95 percent porous metal fiber plaques, to provide positive and negative plates; the iron active material comprising iron particles and an additive of either sulfur, selenium or tellurium and the nickel active material comprising nickel hydroxide precipitate, (2) alternately stacking the positive and negative plates with a separator between each plate, (3) placing the stacked plates into a case, (4) filling the case with an alkaline electrolyte, and (5) attaching cover with associated terminals and insulators to the top of the case.

12 Claims, 4 Drawing Figures

HIGH ENERGY DENSITY IRON-NICKEL BATTERY

This is a continuation of application Ser. No. 055,824 filed July 17, 1970.

BACKGROUND OF THE INVENTION

The Fe-Ni cell has been known for many years. The present Fe-Ni cell was developed in 1908 By Thomas Edison and has, essentially, retained its original basic construction and design. It is known for its ruggedness and long life properties in such applications as railroad lighting where high power densities, high stored energy/unit volume and weight savings are not critical.

SUMMARY OF THE INVENTION

Our invention relates to the development of a new and vastly improved iron-nickel cell for use in a battery. This cell is unique in that it advances the state of the art of existing, practical iron-nickel battery systems by providing heretofore unattainable stored energy and power. Our high energy density Fe—Ni cell delivers up to about 25 Wh/pounds (Watt-hours/pound of finished cell) stored energy (2 Wh/in$^3$ of finished cell) at a 2 hour drain rate and up to about 40W/pounds (Watts/pound of finished cell) power capability. Our cell can be fast charged at a 2 to 5 hour charge rate and shows good retention of capacity as a function of drain rate (1 to 8 hour range).

Our cell achieves these superior properties by utilization of a flexible, expansible, fibermetal plaque structure, superior conditioned active materials in the nickel and iron plates, a high active material loading per unit volume of plate and closely supervised cell stack-up and battery assembly.

Briefly, construction of our high energy density Fe—Ni cell begins with the fabrication of the current collecting electrode structure. This electrode contains, within the pores of its structure, a large volume provision for loading the active material required for each particular plate. Our cell utilizes a unique flexible, expansible, metal fiber structure in its Fe and Ni electrodes. The fibers of this structure are preferably diffusion bonded together.

The fibermetal plaque for the iron (negative) electrode is loaded with a sulfurized magnetic iron oxide. This material can be loaded into the pore volume of the fibermetal structure by a wet pasting method.

The fibermetal plaque for the nickel (positive) electrode can be loaded by a molten salt impregnation method. This process impregnates a hydrated nickel nitrate solution, preferably doped with hydrated cobalt nitrate, into the fibermetal plaque pore volume. The solution is chemically reacted with hot alkali hydroxide to produce a metal $(OH)_2$ active material precipitate within the plaque. Intermediate electrical charging (oxidizing) between additional loading steps is used to electrochemically attach the active material precipitate to the fibermetal structure and expand the structure to allow further loading. This plaque may also be loaded by an acid salt impregnation and electroprecipitation technique.

The iron and nickel plates are then alternately stacked and insulated from each other with a separator, overwrapped, and the iron plaques given a final charging at high current density. The cells are then final assembled into a case which is filled with electrolyte and sealed with a case cover having associated terminals, vents and insulators.

BRIEF DESCRIPTION OF THE DRAWINGS

For a better understanding of the invention, reference may be made to the exemplary embodiments shown in the accompanying drawings, in which.

DESCRIPTION OF THE PREFERRED EMBODIMENTS

Figure 1:
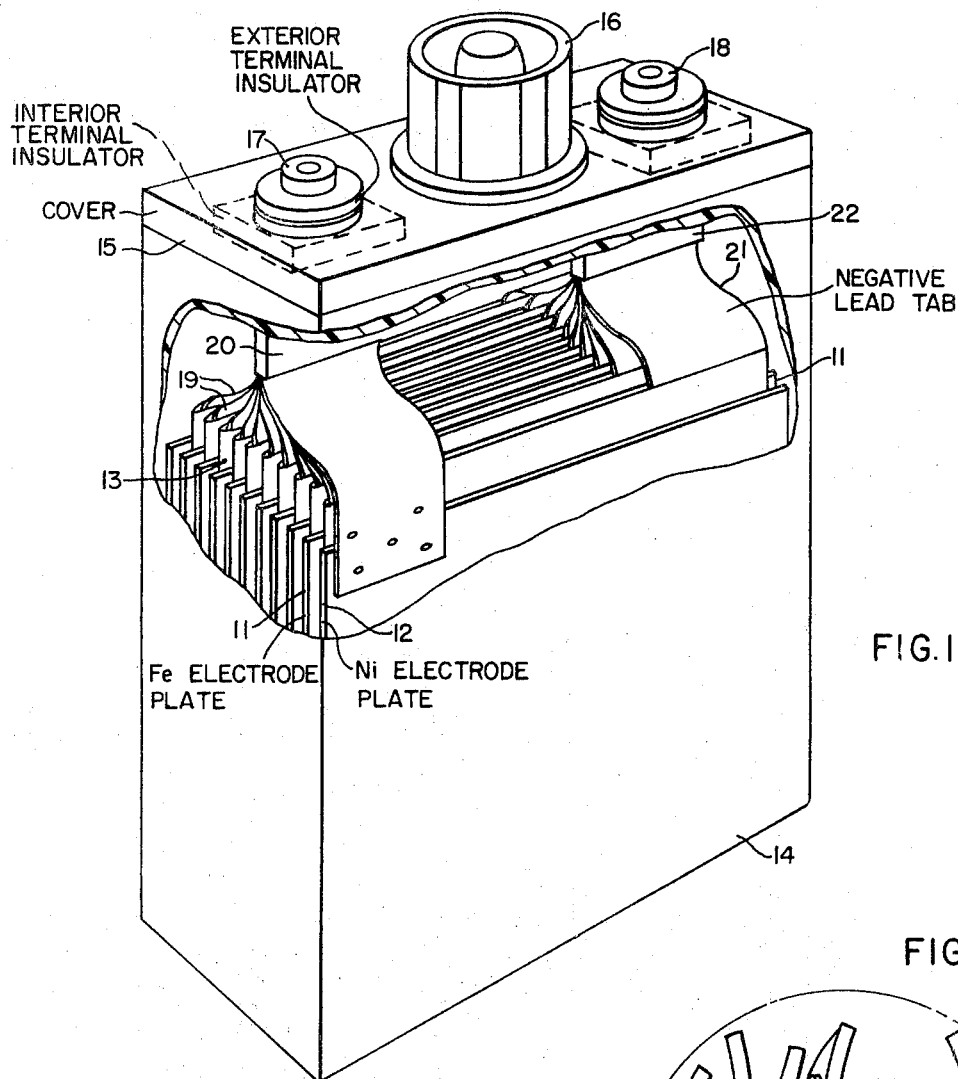
FIG. 1, shows a perspective view of the finished Fe—Ni high energy density cell of this invention.

FIG. 1, shows one embodiment of our Fe—Ni cell with the plurality of loaded negative Fe electrode plates 11, plurality of loaded positive Ni electrode plates 12, plate separators 13 between the positive and negative plates, all housed in case 14, having cover 15, vent 16, positive terminal 17, and negative terminal 18. Also shown are exterior and interior terminal insulators having a rubber gromet therebetween. Positive lead tabs 19 are shown attached to intercell connection lug 20 and negative lead tabs 21, disposed 180° away from the positive tabs, are shown attached to intercell connection lug 22. These lead tabs provide means for making electrical connections to the respective plates. Electrolyte (not shown) would contact the electrode plates and separators within the case. The plate separators are generally shown at 13, not surrounding the plates for clarity of illustration.

Figure 2:
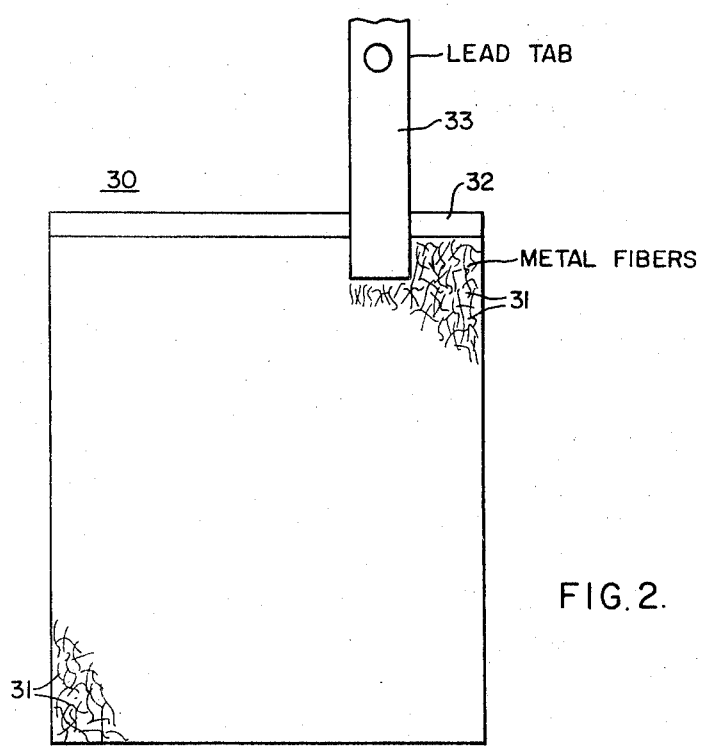
FIG. 2, shows one configuration of the unloaded, flexible, expansible, fibermetal electrode plaque that can be used in the battery of this invention.

We found a flexible, expansible, electrode plaque as shown in FIG. 2, to offer unique advantages in our battery over an Edison cell type plate plaque. It is made from metal fibers, preferably nickel, or metal coated fibers, such as nickel coated steel or iron. The unloaded plaque 30, which can be used as a positive or negative plaque, is a flexible, expansible, compacted sheet of relatively smooth, generally contacting, intermingled, metal fibers as shown at 31 in the body of the plaque. The plaque has, in the embodiment shown, top edge 32 coined to a high density. The coined area provides a base to which lead tab 33 is spot welded or otherwise attached. Generally, the fibers when they are round have diameters between about 0.0002 to 0.005 inches. The plaque porosity is preferably between 75 and 95 percent porous i.e. having a plaque density between 5 and 25 percent of theoretical density. Active electrode material is loaded into the interstices of the body of this fibrous plaque to provide an electrode plate.

Figure 3:
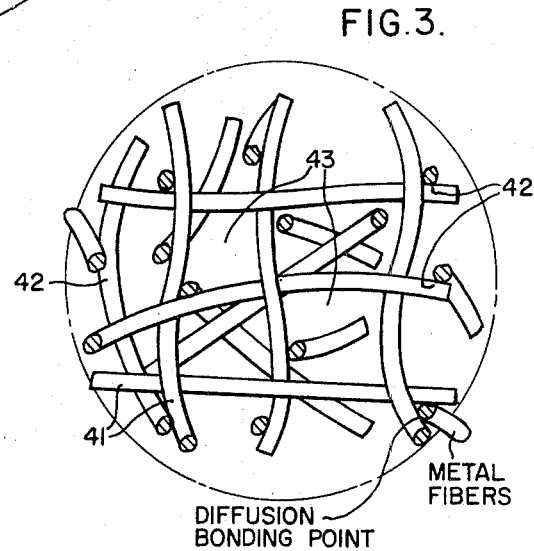
FIG. 3, shows a magnified view of the diffusion bonded fibers of a preferred fibermetal electrode plaque.

The metal fibers, which may be as long as the plaque itself, may be diffusion bonded in a protective atmosphere at temperatures up to the melting point of the fibers used, to provide the preferred, bonded plaque structure shown as a magnified view in FIG. 3. Diffusion bonding also lowers the electrode plate resistance appreciably and thus the internal cell resistance in a finished cell. In diffusion bonding, the fibers must not be melted, or clefts and protuberances will be formed reducing active material loading (volume) within the plaque. There should only be a metallurgical bond and interdiffusion of atoms across the fiber interface. As can be seen in FIG. 3, the metal fibers 41, bonded together at contact points 42 along their length, have a substantially smooth and even surface and provide large active material pore areas 43 between fibers within which the active battery material can be pasted, impregnated or precipitated. The metal fiber geometry may be other than the substantially circular cross-section shown. The fibers may be laid at any angle up to the ninety degree angle between fibers shown in FIG. 3. As shown, in order to achieve a highly porous plaque, the fibers must have a long length to diameter or cross-section ratio.

The fibermetal plaque that is to be used as the negative iron plate can be loaded with pure iron oxide active material by a pasting or other impregnation technique. To promote the charging of the compacted active material, as well as to facilitate the discharging of the electrode plate, a reaction promoting additive such as sulfur, selenium or tellurium, generally in purified form or as a salt, is preferably added up to about 20 percent of the weight of the iron oxide active material generally by mechanical mixing. Such an additive keeps the iron plate active material in an active state.

Sulfurized iron oxide and/or iron oxide hydrate particles, prepared according to the teachings of U.S. Pat. No. 3,507,696 and assigned to the assignee of this invention, provide an excellent iron active material for use in the negative battery plate. This iron active material has a fused coating of high purity additive over the irregular surface of the iron particles. The additive, preferably sulfur, is introduced in the range of about 5 to 20 percent of the weight of the iron particles ($FeO$, $Fe_2O_3$, $Fe_3O_4$, $Fe_2O_3 \cdot H_2O$ or mixtures thereof).

One method of loading the nickel (positive) plaques is described in U.S. application Ser. No. 764,461, filed on Oct. 2, 1968 now abandoned and assigned to the assignee of this invention, and encompasses molten hydrated nitrate salt impregnation, chemical reaction of the nitrate salt with hot alkali hydroxide and intemediate formation between additional molten impregnation steps to densify the active material, open pore areas and improve loading.

At this point the iron (negative) plates and nickel (positive) plates must be alternately stacked, and caustic resistant separators placed between adjacent plates to form cells and the cells assembled to make an Fe—Ni battery.

The iron plates in the cell stack up are still in the pasted, unformed condition. Formation of the iron plates can be accomplished by a series of electrical charging and discharging cycles. charging is accomplished in an aqueous KOH bath, with the negative intercell connection lug as cathode and a dummy nickel electrode as anode. This initial charging increases electrical conductivity and electrochemically attaches the sulfurized iron active material to the plaque fibers. At the end of this period, the positive terminal intercell connection of the battery stackup is made anodic with the negative terminal lug still cathodic and a high current used to fully charge the active iron material. Finally, the stack up is placed in the case and positive and negative terminals are suitably insulated.

EXAMPLE I

Nickel fibers approximately 0.001 × 0.002 × 0.25 inch long were used in making our flexible expansible fiber metal plaques. These fibers were laid into unbonded fiber metal sheets. They were then heated, in a protective environment, causing metal to metal diffusion bonds to form at fiber contact points. There was no melting of fibers so as to assure maximum pore volume.

The nickel plaques were then coined to 14.5 percent of theoretical density, 85.5 percent porous, and the "iron" plaque bodies were coined to 7.9 percent of theoretical density, 92.1 percent porous. A nickel sheet was then spot welded onto the top coined corner of the plaques to form a lead tab connection.

The iron active material comprised sulfurized magnetic iron oxide particles. The magnetic iron oxide, having a composition of 79 percent $Fe_2O_3$, 22 percent $FeO$ and 1 percent impurities, was blended with elemental flowers of sulfur, placed in a container, and heated to sulfur fuse coat the iron oxide particles. Enough sulfur was used to provide a ratio of sulfur to iron oxide initially on the order of 5 to 20 percent of the weight of the iron oxide. We found this large amount of additive helped keep the iron active material surface in the active state.

The "iron" plaques were loaded with the sulfurized magnetic iron oxide by a wet pasting technique. These iron plates were then sized and dried. They contained about 1.75 grams/cm³ plaque volume of iron active material.

The nickel active material comprised nickel hydroxide doped with a small amount of cobalt hydroxide loaded by a molten salt impregnation method. The plaques were immersed in a molten salt solution of 20 parts by weight $Ni(NO_3)_2 \cdot 6H_2O$ to 1 part by weight $Co(NO_3)_2 \cdot 6H_2O$. It was maintained at a temperature of 85°–90°C.

The impregnated nickel fibermetal plaques were then reacted in an aqueous 25 weight percent NaOH solution maintained at a temperature of 110°C. The molten nitrate salt in the plaque pores was converted by chemical reaction with the hot hydroxide to $Ni—CO(OH)_2 \cdot nH_2O$ (the active material in the discharged state), while the plaque was cathodically protected. The loaded plaques were then washed in deionized water and dried.

The plaques were now ready for re-impregnation in the molten nitrate salt. After the fourth molten salt impregnation-wash cycle, the plaques, usually loaded with about 1.75 grams/cm³ of active material, were incapable of efficiently loading further active material due to clogging of the original pore volume. To electrochemically attach the loaded active material to the flexible, expansible, nickel fiber metal structure of the plaque, as well as expand the plaque volume (and thereby increase the pore volume to enable additional active material loading), the plaques were given an intermediate formation in KOH solution at a charge of 6mA/cm² current density for 8 hours. They were then discharged at 9mA/cm² current density (nickel plaque negative) for 4 hours and recharged (nickel plaque positive) for 8 hours. Following the intermediate formation, the plaques were given a wash treatment. The rack was then recycled through the molten impregnation active material loading step.

After 3 additional molten impregnation-wash cycles, the plaques were loaded with about 2.7 gram/cm³ of active material each. The plaques were again returned to the formation station and given a second intermediate formation: charge for 8 hours, discharge for 4 hours and charge for 8 hours. The plaques were then washed and dried.

The plaques were then given 3 more molten nitrate salt impregnation cycles to attain plaques loaded with about 3.4 grams/cm³ of active material each. At this loading of active material, the plaques were given a final formation identical to the second intermediate formation. After the final formation, the plaques were washed and dried. Therefore, the nickel plaques received 4 impregnations − interim formation 3 impregnations − interim formation − 3 impregnations − and a final formation. The iron and nickel plates were then ready for the cell stack up operation.

In the stack-up operation, iron and nickel plates were alternately stacked, insulated from each other with a separator and the intercell connection lugs were spot welded to the tabs. The cell stack up was then inserted into the battery case.

The iron plaque in the cell stack-up was still in the pasted, unformed condition. Formation of the iron plaques was accomplished, by a series of charge-discharge cycles.

An internal terminal insulator and rubber grommet were placed over the post portion of the terminal to insulate the cell. The cover of the cell was welded to the metal case and a vent cap was inserted in the cover. When the terminal was pulled up tight against the underside of the cover, the top of the rubber grommet projected above the cover. A nylon exterior terminal insulator washer was placed on top of the grommet to provide a tight seal around the terminal and the cover. The cell was now ready for final testing and use.

Figure 4:
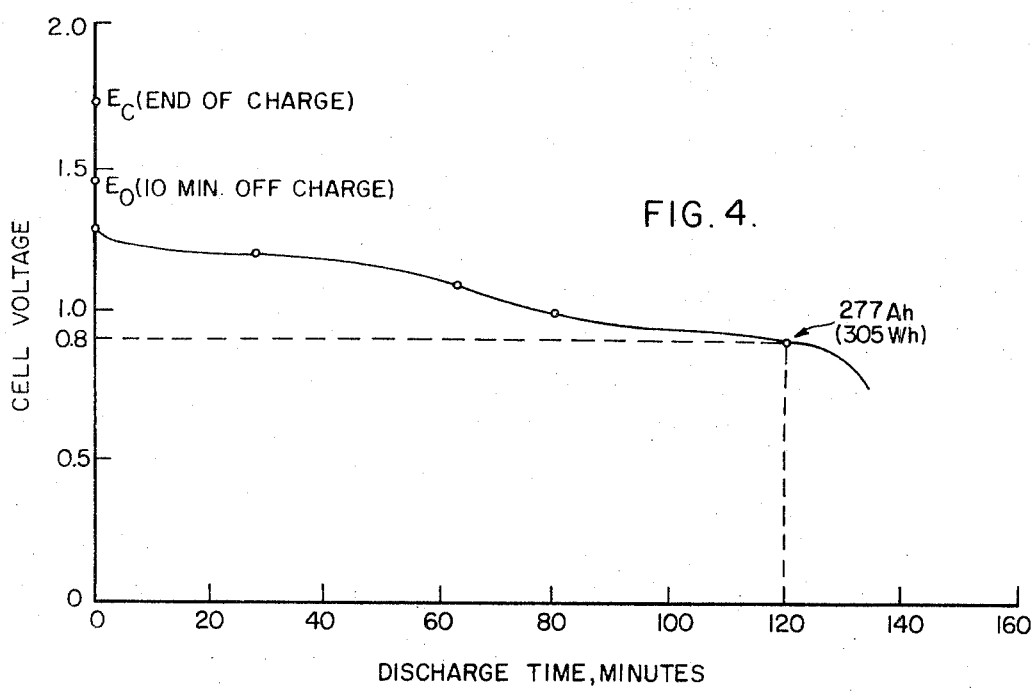
FIG. 4 shows a voltage vs. time discharge curve for the completed Fe—Ni cell of Example 1.

Finished cells were then bench tested through several 5 hour charge, 2 hour discharge test cycles to establish their capacity rating. Best test results obtained were 277 Ah capacity to the 0.8 volt cutoff at the 2 hour drain rate. This capacity yielded 305 Wh, or 24 Wh/pounds (Watt-hours/lb.) of cell and 1.83 Wh/in³ of cell. This Fe-Ni cell exhibited a very good retention of capacity as a function of drain rate. For example, capacity tests run on this same cell varied from 311 Ah at a 30 ampere drain rate for 8 hours to 270 Ah at a 180 ampere drain rate for 1 hour and 20 minutes, for a 14 percent variation over this drain rate range. A discharge curve for this cell is presented in FIG. 4. A series of cells were then connected to form a battery having outstanding stored energy and power capability.

We claim:

1. an iron nickel storage battery comprising a case and a cover within which is disposed:
   1. at least one positive electrode plate comprising:
      a. a flexible, expansible, 75 to 95 percent porous plaque made of fine, contacting, metal fibers having unmelted metal to metal bonds of the fibers at their contact points by an interdiffusion of metal fiber atoms across the fiber interface, the bonded fibers being free of melt protuberances, and an active electrode material comprising nickel hydroxide distributed upon and disposed within the pore volume of the plaque
      b. an electrical lead tab attached to the plaque
   2. at least one negative electrode plate comprising:
      a. a flexible, expansible, 75 to 95 percent porous plaque made of fine, contacting, metal fibers having unmelted metal to metal bonds of the fibers at their contact points by an interdiffusion of metal fiber atoms across the fiber interface, the bonded fibers being free of melt protuberances, and an active electrode material comprising iron oxide particles having a fused coating of a sulfur additive said additive being present up to about 20 percent of the weight of the iron particles, said active material distributed upon and disposed within the pore volume of the plaque
      b. an electrical lead tab attached to the plaque
   3. a separator between the plates
   4. an alkaline electrolyte, and
   5. means for making electrical connections to the respective plates.

2. The battery of claim 1 wherein the active material of the negative electrode plates comprises iron particles selected from the group consisting of iron oxide, iron oxide hydrate and mixtures thereof, and the active material of the positive electrode plate comprises Ni(OH)₂, with a small amount of Co(OH)₂.

3. The battery of claim 2 wherein the additive is present in the range of about 5 to 20 percent of the weight of the iron particles.

4. The battery of claim 2 wherein the plaque fibers are selected from the group consisting of nickel, nickel coated steel and nickel coated iron fibers.

5. The battery of claim 2 wherein the lead tabs on the positive and negative plates are turned 180° from each other, each positive tab being connected to a positive terminal and each negative tab being connected to a negative terminal, said terminals extending through the cover.

6. The battery of claim 2 wherein the electrolyte is KOH, the case has disposed therein a plurality of alternating positive and negative plates which are insulated from the case by a plastic sheet material, and the cover contains a vent.

7. An iron-nickel storage battery comprising a case and a cover within which is disposed:
   1. at least one positive electrode plate comprising:
      a. a flexible, expansible porous plaque consisting of fine, contacting metal fibers having unmelted metal to metal bonds of the fibers at their contact points by an interdiffusion of metal fiber atoms across the fiber interface, the bonded fibers being free of melt protuberances, and an active electrode material consisting essentially of nickel hydroxide with a small amount of cobalt hydroxide distributed upon and disposed within the pore volume of the plaque
      b. an electrical lead tab attached to the plaque
   2. at least one negative electrode plate comprising:
      a. a flexible, expansible, porous plaque consisting of fine, contacting, metal fibers having unmelted metal to metal bonds of the fibers at their contact points by an interdiffusion of metal fiber atoms across the fiber interface, the bonded fibers being free of melt protuberances, and an active electrode material consisting essentially of iron oxide particles having a fused coating of sulfur, said sulfur being present up to about 20 percent of the weight of the iron particles, said active material distributed upon and disposed within the pore volume of the plaque
      b. an electrical lead tab attached to the plaque, wherein each positive tab connected to a positive terminal and each negative tab connected to a negative terminal, said terminals extending through the cover 3. a separator between the plates, and 4. an alkaline electrolyte.

8. The battery of claim 7 wherein the metal fibers are bonded in a protective atmosphere at temperatures up to the melting point of the fibers used, sulfur is present in the range of about 5 to 20 percent of the weight of the iron particles, the case has disposed therein a plurality of alternating positive and negative plates which are insulated from the case by a plastic sheet material, and the cover contains a vent.

9. The battery of claim 8, wherein the plaque fibers are selected from the group consisting of nickel coated steel and nickel coated iron fibers having cross sections between about 0.0002 to 0.005 inches, said coating being applied after the bonding of fibers.

10. The battery of claim 7, wherein the plaque fibers are uncoated nickel fibers having cross sections between about 0.0002 to 0.005 inches.

11. An iron-nickel storage battery comprising a case and a cover within which is disposed:

1. at least one positive electrode plate comprising:
   a. a flexible, expansible, porous plaque consisting of fine, contacting metal fibers selected from the group consisting of uncoated steel and iron having a long length to cross section ratio and unmelted metal to metal bonds of the fibers at their contact points said fibers being bonded in a protective atmosphere at temperatures up to the melting point of the fibers used, causing an interdiffusion of metal fiber atoms across the fiber interface, the bonded fibers being free of melt protuberances, the fibers having a nickel coating applied after bonding and an active electrode material consisting essentially of nickel hydroxide with a small amount of cobalt hydroxide distributed upon and disposed within the pore volume of the plaque
   b. an electrical lead tab attached to the plaque 2. at least one negative electrode plate comprising:
   a. a flexible, expansible porous plaque consisting of fine, contacting, metal fibers selected from the group consisting of uncoated steel and iron having a long length to cross section ratio and unmelted metal to metal bonds of the fibers at their contact points said fibers being bonded in a protective atmosphere at temperatures up to the melting point of the fibers used, causing an interdiffusion of metal fiber atoms across the fiber interface, the bonded fibers being free of melt protuberances, the fibers having a nickel coating applied after bonding and an active electrode material consisting essentially of iron oxide particles having a fused coating of a sulfur additive, said additive being present up to about 20 percent of the weight of the iron particles, said active material distributed upon and disposed within the pore volume of the plaque
   b. an electrical lead tab attached to the plaque, wherein each positive tab connected to a positive terminal and each negative tab connected to a negative terminal, said terminals extending through the cover 3. a separator between the plates, and 4. an alkaline electrolyte.

12. The battery of claim 11 wherein the additive is fuse coated to the iron oxide particles and is present in the range of about 5 to 20 percent of the weight of the iron particles.

* * * * *